June 5, 1956 — W. F. STAHL — 2,748,911
MAGNETIC FLUID CLUTCH
Filed Oct. 9, 1951
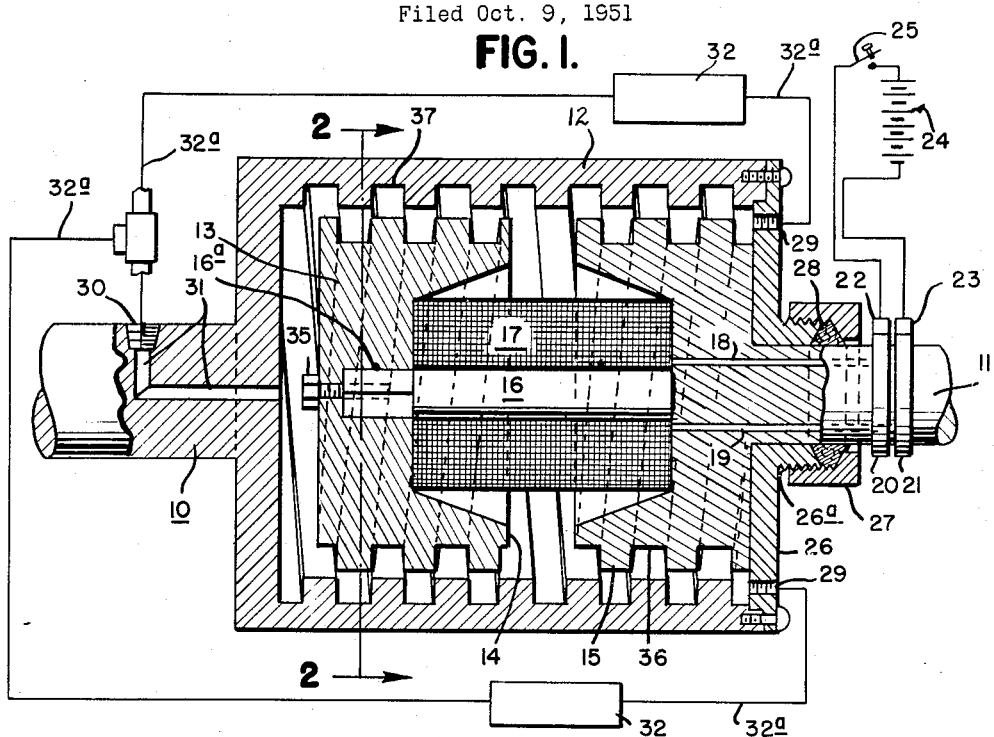
FIG. 1.
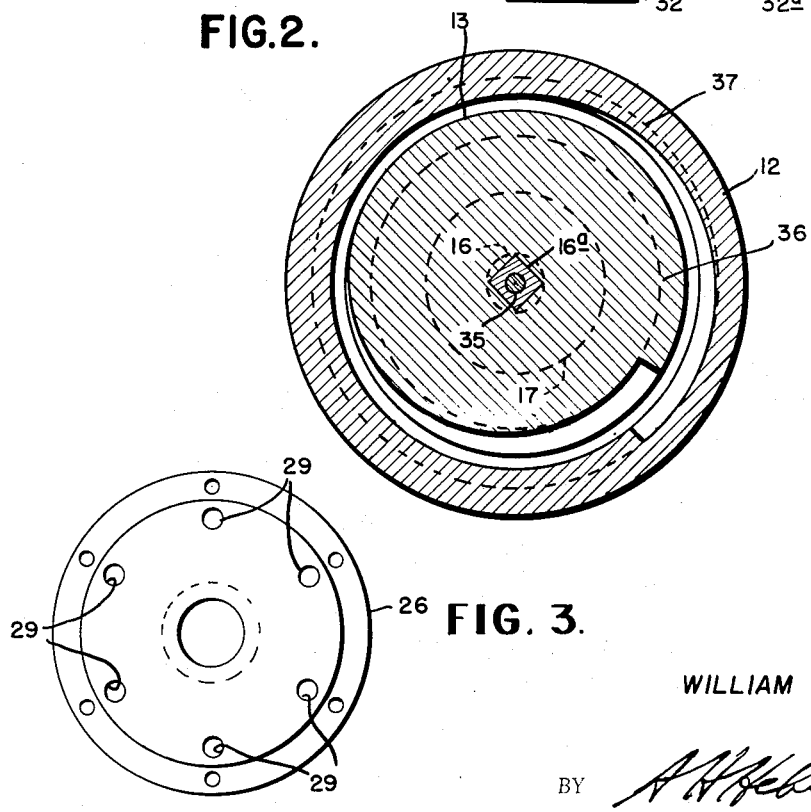
FIG. 2.
FIG. 3.
INVENTOR
WILLIAM F. STAHL
BY
ATTORNEY United States Patent Office 2,748,911
Patented June 5, 1956

2,748,911
MAGNETIC FLUID CLUTCH

William F. Stahl, Upper Darby, Pa., assignor, by mesne assignments, to the United States of America as represented by the Secretary of the Navy Application October 9, 1951, Serial No. 250,535

3 Claims. (Cl. 192—21.5)

The present invention relates to power transmission and more particularly to an improved magnetic fluid clutch.

Magnetic fluid clutches may assume numerous physical appearances and configurations to perform particular tasks, however, they all work on the same basic principle and comprise two members suitably supported in close proximity to each other and independently journalled for rotation about a common axis. The space separating the two members is filled with a magnetizable fluid, such as iron powder suspended in oil, offering negligible coupling between the members when not magnetized and very tight coupling when subjected to a magnetic field. Typical structures may take the form of coaxially mounted cylinders, one within the other, or of adjacent discs. With such clutch devices some slippage is inevitable, resulting in the generation of heat which must be removed to prevent excessive heat build-up. Removal of this heat imposes numerous difficulties in applications where frequent engagement is encountered because the magnetizable fluid does not flow readily when energized and in conventional previous structures would not move fast enough to permit adequate cooling under operating conditions of considerable slippage.

Accordingly, it is an object of the present invention to provide improved cooling for a magnetic fluid clutch.

Another object of the present invention is to provide means for circulating a cooling medium through a magnetic fluid clutch.

Other and further objects and features of the present invention will become apparent upon a careful consideration of the following detailed description and the accompanying drawings wherein, Fig. 1 shows a longitudinal vertical cross sectional view of an electro-magnetic fluid clutch embodying features of the present invention.

Fig. 2 shows a transverse horizontal cross-sectional view taken on the line 2—2 of Fig. 1; and Fig. 3 shows an inside view of the clutch end plate to a scale reduced from that of Figs. 1 and 2.

In accordance with the basic features of the present invention, a magnetizable fluid clutch is provided which will start heavier loads with greater frequency than previous clutches of comparable size because of improved cooling obtained by forming lead grooves on one or both of the clutch members to physically displace the solidified magnetizable fluid when there is clutch slippage. The displaced fluid thus removed from the magnetic field of the clutch, being in a fluid state, is passed through an external heat exchanger where it is cooled and then returned to the clutch.

With particular reference now to Fig. 1 of the drawing a magnetizable fluid clutch is shown therein coupling the shafts 10 and 11. Although no means for supporting shafts 10 and 11 is shown, in order to avoid undue complexity, it is understood that the shafts are suitably journalled in line. Shaft 10 may be considered as being the input or driving shaft while shaft 11 may be considered the output or driven shaft.

Shaft 10 is connected to the clutch housing 12 inside of which is placed the clutch inner member 13. Clutch member 13 is connected to shaft 11 and is composed of two end portions 14 and 15 joined by a connecting shaft 16 upon which is mounted a magnetizing coil 17. Shaft 16 may actually be a reduced diameter extension of shaft 11 provided with a square or keyed portion 16–a to positively engage end portion 14 of inner member 13. Coil 17 is energized by current supplied through wires 18, 19, relatively insulated commutator rings 20, 21, brushes 22, 23, battery 24 and control switch 25.

When coil 17 is thus energized, a magnetic field is set up in the magnetic series path including shaft 16, end portion 14, the first annular space or gap disposed between the outside of end portion 14 and the corresponding portion of the inside of housing 12, housing 12, the second annular space or gap disposed between the inside of housing 12 and the outside of end portion 15, and end portion 15 itself. The magnetic fields set up in the above mentioned gaps cause solidification of the magnetizable fluid so that considerable attraction exists between the housing 12 and the end portions 14 and 15.

Clutch housing 12 has a cover plate 26 at one end thereof. In the center of plate 26 is an opening to permit entry of the shaft 11. Over the opening is a hollow externally threaded protrusion 26–a having an inner diameter slightly larger than the diameter of shaft 11. This protrusion forms a part of a packing gland to retain fluid within the clutch. The protrusion 26–a is thus cooperative with an internally threaded cylindrical packing nut 27 and packing 28 to provide a liquid tight seal preventing loss of fluid. In this connection it must be understood that the particular type of seal herein shown is exemplary only and that in many instances a mechanical seal may be preferable.

Plate 26 also has a series of holes 29 disposed in circular configuration communicating with the space formed between the inside surface of clutch housing 12 and the clutch inner member 13 at the end thereof in proximity to shaft 11.

The opposing end of this space between the clutch housing 12 and inner member 13 is communicated to an opening 30 in shaft 10 by means of passage 31 through a portion of shaft 10. Holes 29 are externally connected to shaft opening 30 by way of heat exchange devices 32, through suitable piping, indicated schematically by 32–a.

The inner surface of clutch housing 12 has formed thereon a helical groove of a first hand whereas the circumferential surfaces of the end portions 14 and 15 of inner member 13 have formed thereon a helical groove of a second (opposing) hand. By this groove formation relative rotation of the clutch inner and outer members as would occur during slippage exerts a longitudinal force on whatever material is in the space between the members, pushing the material toward one end of the clutch assembly. The direction of groove lead is selected in accordance with the direction of clutch rotation so that in operation this longitudinal force is exerted toward the cover plate 26. In the specific case where the material between the clutch members is magnetizable fluid, the material is pushed somewhat as a granular, semi-solid toward the holes 29 in cover plate 26. When the material reaches holes 29, it is effectively out of the magnetizing field so that it is in a fluid condition to readily travel through heat exchange devices 32 to later return to the clutch by way of shaft hole 30 and passage 31 to again become magnetized.

The heat exchange devices shown in block form in Fig. 1 may assume any practical form suitable to perform the expressed job of cooling the magnetizable fluid expelled from holes 29 and returning it to the shaft hole 30. In perhaps the simplest form the exchangers may be merely tubular members, with or without fins, attached to clutch housing 12 and which are moved thereby through the surrounding medium due to the rotation thereof. It is for this reason that shaft 10 has been specified as the drive shaft because under conditions of slippage the shaft 10 will rotate faster than the driven shaft 11 to provide better cooling when it is needed.

The helical grooving shown in Fig. 1 make take any form capable of exerting a displacement force on the clutch magnetizable fluid. Both members may be helical and of opposite hands as shown, or one member may have helical grooving and the other longitudinal grooving, or as a still further alternate form the members may have helical grooving of the same hand but different "pitch" or lead. As a matter of fact almost any form of grooving producing longitudinal "leading" when there is relative motion between the two members may be used. In the embodiment herein shown the housing possesses a left hand helix while the end portions 14 and 15 are cut into the form of a right hand helix.

Under certain conditions it may be desirable to have the magnetic material travel through the clutch from holes 29 to shaft hole 30 to reduce thrust on the end plate 26. In this case fluid flow in the external (cooling) circuit would also be reversed. Such condition offers no particular difficulties requiring merely that the lead direction for the helical grooves be appropriate to the direction of rotation of the inner and outer members.

Similarly where the clutch members are parallel adjacent discs rather than coaxial cylinders but still employing magnetic energization, the teachings of the present invention may be employed with equal facility. In such case the faces cooperating to form the clutch would possess differential spiral grooving to cause progression of the magnetizable fluid through the clutch.

Fig. 2 shows a section view of the clutch of Fig. 1 along the line indicated 2—2 in Fig. 1. This figure shows the clutch housing 12, clutch inner member 13, shaft 16 and mounting bolt 35. Also indicated in dotted form is the periphery of magnetizing coil 17, the maximum depth 36 of the grooves in clutch inner member 13 and the maximum depth 37 of the grooves in clutch housing 12.

Fig. 3 shows a view to a scale different from that of Fig. 2 of the inside face of cover plate 26 indicating the holes 29 for the exit of magnetic fluid and the opening for shaft 11.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A magnetic coupling comprising a housing having side and opposed end walls, an inner member mounted for relative rotation with and axially aligned within the housing to provide a longitudinal space therewith, said inner member having one end wall positioned inwardly of one opposed end wall of the housing forming a transverse space in communication with said longitudinal space and providing therewith a fluid path, the other opposed end wall of the inner member abutting the other end wall of the housing and preventing circulation of the fluid within the housing, inlet means in said one opposed end wall of the housing for supplying magnetizable fluid to the fluid path, outlet means in the other opposed end wall of the housing in communication with the fluid path, a magnet carried by the inner member for magnetizing the fluid, groovular means disposed in said longitudinal space for directing the fluid between said inlet and outlet during relative rotation between the housing and the inner member and conduit means between the inlet and outlet and exteriorly of the housing for effecting circulation of the fluid during relative rotation of the housing and inner member.

2. A magnetic coupling comprising a housing having side and opposed end walls, an inner member mounted for relative rotation with and axially aligned within the housing to provide a longitudinal space therewith, said inner member having one end wall positioned inwardly of one opposed end wall of the housing forming a transverse space in communication with said longitudinal space and providing therewith a fluid path, the other opposed end wall of the inner member abutting the other end wall of the housing and preventing circulation of the fluid within the housing, inlet means in said one opposed end wall of the housing for supplying magnetizable fluid to the fluid path and outlet means in the other end wall of the housing in communication with the fluid path, a magnet carried by the inner member for magnetizing the fluid, first hand helical groove means on one of the coupling members and second hand helical groove means on the other coupling member for directing the fluid between said inlet and outlet during relative rotation between the housing and the inner member and conduit means between the inlet and outlet and exteriorly of the housing for effecting circulation of the fluid during relative rotation of the housing and inner member.

3. A magnetic coupling as in claim 1, further characterized by said inner member comprising spaced cylindrical segments having a magnet therebetween and first hand helical groove means in the inner face of the housing and second hand helical groove means in the cylindrical segments.

References Cited in the file of this patent

UNITED STATES PATENTS

| | | |
|---|---|---|
| 2,575,360 | Rabinow | Nov. 20, 1951 |
| 2,604,964 | Winther et al. | July 29, 1952 |
| 2,605,876 | Becker | Aug. 5, 1952 |
| 2,663,809 | Winslow | Dec. 22, 1953 |

FOREIGN PATENTS

| | | |
|---|---|---|
| 976,917 | France | Mar. 23, 1951 |